United States Patent
Beausoleil et al.

(10) Patent No.: US 7,359,101 B2
(45) Date of Patent: Apr. 15, 2008

(54) TESTS OF QUANTUM INFORMATION

(75) Inventors: Raymond G. Beausoleil, Redmond, WA (US); William J. Munro, Bristol (GB); Timothy P. Spiller, Bristol (GB); Willem K. van Dam, Santa Barbara, CA (US)

(73) Assignee: Hewleet-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/940,390

(22) Filed: Sep. 13, 2004

(65) Prior Publication Data

US 2006/0056631 A1 Mar. 16, 2006

(51) Int. Cl.
*G02F 3/00* (2006.01)

(52) U.S. Cl. .................. 359/107; 359/108; 398/140

(58) Field of Classification Search ............... 359/107, 359/108; 398/140
See application file for complete search history.

(56) References Cited

U.S. PATENT DOCUMENTS

2002/0106084 A1* 8/2002 Azuma et al. ............. 380/263
2003/0086138 A1* 5/2003 Pittman et al. ............. 359/108
2005/0254823 A1* 11/2005 Beausoleil et al. ......... 398/140

OTHER PUBLICATIONS

B Sanders—"Classical vs Quantum Fingerprinting"—Proc 35th Int'l Symposium on Multiple-Valued Logic—May 2005—pp. 2-5.
Patent Abstracts of Japan—"Quantum Cash Issuing Device, Quantum Cash using Device, Quantum Case Method and Program" vol. 2003 No. 12.
Gottesman, Daniel and Chuang, Isaac L., "Quantum Diigital Signatures", arXiv:quant•ph/0105032 v2 (Nov. 15, 2001).
Song, Daegene, "Secure key distribution by swapping quantum entanglement" Physical Review A 69, pp. 034301•1 to 034301•4 (2004).

* cited by examiner

*Primary Examiner*—Fayez G. Assaf

(57) ABSTRACT

Quantum testing can compare unknown photon states in a manner suitable for a validation check of a quantum digital signature, testing of the operation of a quantum gate, or detecting of entanglement. The effect of the QSC system can be used to entangle input photon states. QSC system can include a control swap gate having a control channel that is measured, a beam splitter and a controlled phases gate with a control channel that is measured, or a beam splitter with a parity detector on an output channel. The operation of the QSC system can also be used to generate an entangled photon state.

20 Claims, 6 Drawing Sheets

TESTS OF QUANTUM INFORMATION

BACKGROUND

A digital signature permits a sender to mark a digital transmission so that recipients of the transmission can confirm the origin of the transmission and detect tampering with the transmission. A transmission with a digital signature is thus secure to the extent that only an authorized party can provide the required digital signature authenticating the transmission. For transmissions with conventional digital signatures, the security of a transmission is based on assumptions regarding one-way mathematical functions that convert private information (e.g., a private key) to information for public transmission. However, the security of one-way functions against conventional computing power is generally unproven, and at least some one-way functions are insecure against quantum computing technology, thereby allowing an unauthorized party to extract private information from public transmissions and then forge digital signatures.

Quantum digital signature techniques such as described by Gottesman and Chuang, "Quantum Digital Signatures" (arXiv:quant-ph/0105032) use fundamental principles of quantum physics for secure transmissions of information. These techniques allow a sender to sign a message using a quantum state as a signature. In particular, the sender can prepare copies of a quantum state corresponding to private information that only the sender knows. The sender can then distribute the copies of the quantum state to chosen recipients that use their copies of the quantum state to authenticate the message or detect tampering. The quantum no-cloning theorem prevents persons other than the sender from making further copies of the quantum state/signature, and interception and measurement destroy the quantum signature while providing only limited clues regarding the private information. Accordingly, with proper distribution methods, a quantum digital signature can be kept secure.

Certification of a quantum digital signature generally requires comparisons of copies of the quantum state representing the signature. Efficient methods for state comparisons are thus required.

SUMMARY

In accordance with an aspect of the invention, quantum state comparison (QSC) systems can test quantum systems to detect properties such as the equality or entanglement of unknown states. For example, a QSC can be used to validate quantum signatures, test of the operation of a quantum gate, or detect entanglement of quantum states. Additionally, the effect of the QSC test on input states can be used to entangle the input states or to detect entanglements. One embodiment of the invention is a system including: a first photonic channel for input of a first quantum state; a second photonic channel for input of a second quantum state; a first beam splitter positioned to interfere the first photonic channel and the second photonic channel; and a detector system positioned to measure the second photonic channel. A probability of a first measurement outcome from the detector system is 100% when the first quantum state and the second quantum state satisfy a first relation (e.g., are the same) and is less than 100% when he first quantum state and the second quantum state satisfy a second relation (e.g., are not the same).

BRIEF DESCRIPTION OF THE DRAWINGS

Use of the same reference symbols in different figures indicates similar or identical items.

DETAILED DESCRIPTION

In accordance with an aspect of the invention, a test using a controlled swap gate can compare two unknown quantum states to validate that the two compared states are the same. Such comparisons can be applied to authenticate a quantum signature associated with a message, to detect corruption in or tampering with a message having a quantum signature, to compare quantum gates, to detect entanglement, or to entangle input states.

Figure 1A:
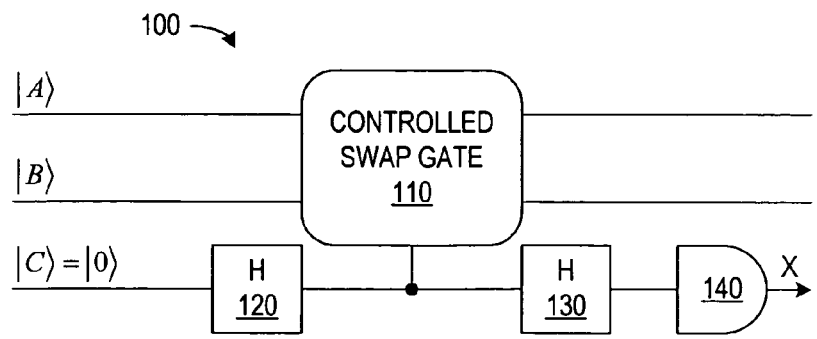
FIGS. 1A and 1B are block diagrams of quantum state comparison systems in accordance with an embodiment of the invention.

FIG. 1A illustrates a Quantum State Comparison (QSC) system 100 in accordance with an embodiment of the invention. QSC system 100 includes a controlled swap gate 110 and two Hadamard transform gates 120 and 130 that collectively perform a coherent quantum transformation on three quantum systems. Two of the quantum systems are of equal dimension D and in unknown quantum states |A> and |B>. In an exemplary embodiment, quantum states |A> and |B> are n-qubit states for an integer n greater than or equal to 1, but quantum states A> and |B> can alternatively represent other discrete quantum information (i.e., one or more qudits) or continuous quantum information (i.e., one or more qunats). The third quantum system generally corresponds to a control qubit |C>.

Hadamard gates 120 and 130 transform the control channel qubit as indicated in Equations 1, where application of a basis state |1> to controlled swap gate 110 causes swapping of states |A> and |B> and application of a basis state |0> does not. In the illustrated embodiment, control qubit |C> is initially in the known state |0>, so that the output state of Hadamard gate 120 is known to be $$\frac{1}{\sqrt{2}}(|0\rangle + |1\rangle).$$

In an alternative embodiment, Hadamard gate 120 can be eliminated and the desired control qubit state $$\frac{1}{\sqrt{2}}(|0\rangle + |1\rangle)$$

can be generated using other techniques. Further, other choices of the initial known state of control qubit |C> (with or without use of Hadamard gate 120) can achieve similar comparison results as described further below.

$$|0\rangle \xrightarrow{H} \frac{1}{\sqrt{2}}(|0\rangle + |1\rangle) \text{ and } |1\rangle \xrightarrow{H} \frac{1}{\sqrt{2}}(|0\rangle - |1\rangle) \quad \text{Equations 1}$$

Equation 2 indicates the action controlled swap gate 110 on the product state after operation of Hadamard gate 120 in FIG. 1. After controlled swap gate 110, Hadamard gate 130 further transforms the control channel to produce a state having the form indicated in Equation 3.

$$\frac{1}{\sqrt{2}}(|0, A, B\rangle + |1, A, B\rangle) \xrightarrow{C-SWAP} \quad \text{Equation 2}$$
$$\frac{1}{\sqrt{2}}(|0, A, B\rangle + |1, B, A\rangle)$$

$$\frac{1}{\sqrt{2}}(|0, A, B\rangle + |1, B, A\rangle) \xrightarrow{H} \quad \text{Equation 3}$$
$$\frac{1}{2}(|0, A, B\rangle + |1, A, B\rangle + |0, B, A\rangle - |1, B, A\rangle)$$

A detector 140 measures the control channel and particularly performs a projective measurement that distinguishes control state |0> from control state |1>. From Equation 3, the probability of a measurement corresponding to state |0> is $$\frac{1}{2}(1 + |\langle A | B \rangle|^2).$$

Accordingly, if states |A> and |B> are the same, the probability of a measurement corresponding to state |0> is one, and a measurement signal X from detector 140 will always have a value corresponding to state |0>. If states |A> and |B> have a small inner product, the probability of a measurement corresponding to state |0> will be less than one and will be one half if states |A> and |B> are orthogonal.

An important application of QSC system 100 uses measurements X to determine whether two unknown quantum states |A> and |B> differ. As described above, a single transformation and measurement of the control channel in QSC system 100 above will indicate that states |A> and |B> are not the same if the measurement outcome X has a value corresponding to state |1>. However, when states |A> and |B> differ, a single measurement outcome has a non-zero probability of corresponding to state |0>, which is the measurement outcome found 100% of the time when states |A> and |B> are the same. Accordingly, a single measurement will fail to detect a difference in states |A> and |B> with a probability of $$\frac{1}{2}(1 + |\langle A | B \rangle|^2),$$

which is less than one when states |A> and |B> differ.

Given k copies of states |A> and |B> and k repetitions of the transformation and measurement, the probability P(k) of all measurement outcomes $X_k$ failing to detect the difference between states |A> and |B> falls exponentially with the number k as indicated in Equation 4. The probability P(k) of a failure to detect a difference between states |A> and |B> can thus be made arbitrarily small if the available number k of copies of the states |A> and |B> is sufficiently large.

$$P(k) = \left(\frac{1 + |\langle A | B \rangle|^2}{2}\right)^k \quad \text{Equation 4}$$

QSC system 100 can also be used when the input states on the A and B channels may be mixed states ρ and σ. However, even when mixed states ρ and σ are identical, the probability of a measurement X of the control channel corresponding to state |0> is less than one. Upon applying QSC system 100 to two mixed states ρ and σ, a measurement with the outcome corresponding to control state |0> will be observed with probability ½+½Trace(ρ·σ) (where the trace is over the product of two density matrices for the mixed states ρ and σ). Accordingly, this measurement cannot detect whether two mixed states ρ and σ are identical, but QSC system 100 can detect "mixed" states ρ and σ that are actually identical pure states (e.g., ρ=σ=|φ><φ|). In particular, if an extended series of measurements all provide outcomes corresponding to control state |0>, the two "mixed" states ρ and σ must actually be equal pure states.

Figure 1B:
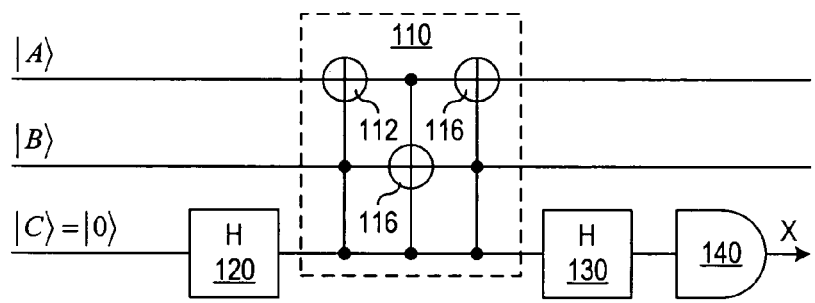

Quantum states |A>, |B>, and |C> can generally be quantum states of any physical system for which a controlled swap gate 110, Hadamard gates 120 and 130, and detector 140 can be implemented. In particular, when each state |A> or |B> corresponds to a qubit, one logical structure for controlled swap gate 110 includes three controlled controlled-NOT (CCNOT) gates or Toffoli gates 112, 114, and 116 as shown in FIG. 1B. The state of the control channel C enables or disables all three Toffoli gates 112, 114, and 116, and channels A and B alternate between being control and target qubit states. The specific implementations of Toffoli gates and the Hadamard gates then depend on the physical systems corresponding to channels A, B, and C. M. A. Nielsen and I. L. Chuang, "Quantum Computation and Quantum Information," Cambridge University Press (2000), further describes construction and use of Toffoli gates. Constructing a controlled swap gate in this manner can require many CNOT gates.

In an exemplary embodiment of the invention, each quantum state |A>, |B>, or |C> is a quantum state of one or more photon channels. For example, each of quantum states |A> and |B> can be a linear combination of two or more states having definite photon number (i.e., Fock states), a coherent photon state, or a squeezed state. A photonic state on single photonic channel can thus represent quantum information such as a qubit, a qudit, or a qunats. In one specific embodiment, each states |A> and |B> represents one or more qubits with each qubit corresponding a separated photonic channel, and state |C> corresponds to a qubit on yet another photonic channel. The basis states |0> and |1> for each qubit can, for example, correspond to Fock states respectively corresponding to 0 and 1 photon in the channel, temporally separated photonic states of the channel, or orthogonal linear polarization states of photons in the channel.

Figure 2A:
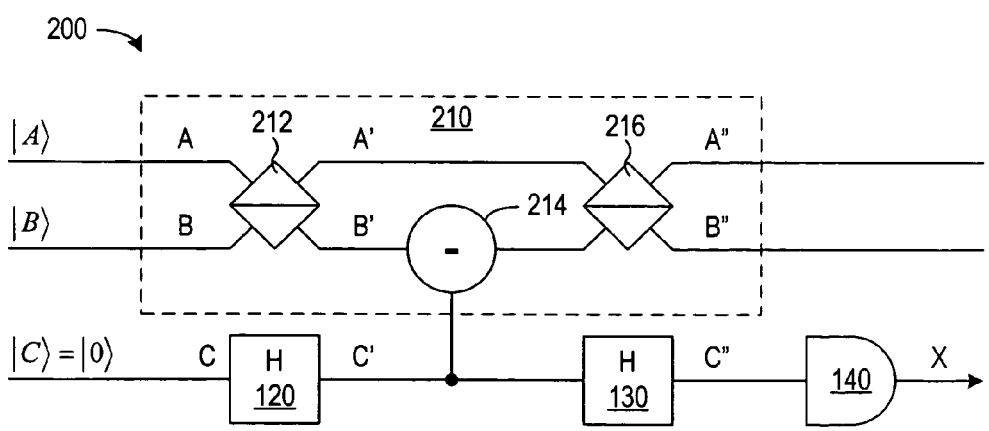
FIGS. 2A, 2B, and 2C show quantum state comparison systems in accordance with embodiments of the invention that use controlled phase gates in controlled swapping of compared photon states.

FIG. 2A shows a QSC system 200 for photonic states, where a controlled swap gate 210 is implemented using a single controlled phase gate 214 and beam splitters 212 and 216 arranged to form a Mach-Zehnder (MZ) interferometer. In system 200, states |A> and |B> are photon states input to channels A and B, and qubit state |C> is a photon state input to a control channel C. Channels A, B, and C can correspond to one or a combinations of optical fibers, waveguides, and/or sections of free space through which photons can propagate.

In one application of QSC system 200, each state |A>, |B>, or |C> is a path-encoded qubit having basis states |0> and |1> respectively corresponding to the absence and presence of a single photon state on the corresponding channel A, B, or C. As will be appreciated by those skilled in the art, other types of qubit encodings such as a polarization encoding of qubits or a time division multiplexed (TDM) encoding can be converted to a path encoding for use of QSC 200. For example, a polarizing beam splitter can convert a polarization encoded qubit having basis states |0> and |1> respectively correspond horizontal and vertical polarization states |H> and |V> by directing one polarization away from the path into QSC 200. QSC system 200 is not limited to comparing state corresponding to qubits but can similarly compare states |A> and |B> that are coherent or squeezed photon states representing qudits or qunats as photon on channels A and B, respectively.

As shown in FIG. 2A, channels A and B are incident on a controlled swap gate 210 including an input beam splitter 212, a controlled phase gate 214, and an optional beam splitter 216. Controlled phase gate 214 is in one channel B' output from beam splitter 212, and beam splitter 216 receives other channel A' from beam splitter 212 and the output from controlled phase gate 214.

In an exemplary embodiment of QSC system 200, states |A> and |B> path are encoded qubit states, and the operation beam splitter 212 transforms creation operators $a_A^\dagger$ and $a_B^\dagger$ for photons in input channels A and B as indicated in Equations 5A. In Equations 5A, operators $a_{A'}^\dagger$ and $a_{B'}^\dagger$ are creation operators for the output channels A' and B' of beam splitter 212. Implementation of the transformation of Equation 5A may require careful adjustment of the position of beam splitter 212 or addition of appropriate phase plates in channels A, B, A', and/or B' to achieve phase relationship of Equations 5A. Similarly, beam splitter 216 is positioned or augmented with phase plates to transform creation operators $a_A^\dagger$ and $a_B^\dagger$, as indicated in Equations 5B, where operators $a_{A''}^\dagger$ and $a_{B''}^\dagger$ are creation operators for the output channels A" and B" of beam splitter 216.

$$a_{A'}^\dagger = 2^{-1/2}(a_{A'}^\dagger + a_{B'}^\dagger)$$ Equations 5A $$a_{B'}^\dagger = 2^{-1/2}(a_{A'}^\dagger - a_{B'}^\dagger)$$

$$a_{A'}^\dagger = 2^{-1/2}(a_{A''}^\dagger + a_{B''}^\dagger)$$ Equations 5B $$a_{B'}^\dagger = 2^{-1/2}(a_{A''}^\dagger - a_{B''}^\dagger)$$

The product of states |A> and |B> have the form of Equation 6 for path encoded qubit states. In Equation 6, basis state |0>$_A$ is the vacuum state, basis state |1>$_A$ is a single photon state, and $A_0$ and $A_1$ are complex parameters for the quantum information represented in channel A. Similarly, for channel B, basis state |0>$_B$ is the vacuum state, basis state |1>$_B$ is a single photon state, and $B_0$ and $B_1$ are complex parameters for the quantum information represented by qubit state |B>.

$$|A\rangle|B\rangle = (A_0|0\rangle_A + A_1|1\rangle_A)(B_0|0\rangle_B + B_1|1\rangle_B) = (A_0 + A_1 a_A^\dagger)(B_0 + B_1 a_B^\dagger)|0\rangle$$ Equation 6

Controlled phase gate 214 causes no phase shift when control channel C is in state |0>$_{C'}$. The relative phase the states of channels A' and B' from beam splitter 212 are thus preserved, and applying the transformations of Equations 5A and 5B to Equation 6 yields an output product state of the form of Equation 7A. In contrast, when control channel C is in state |1>$_{C'}$, controlled phase gate 214 causes a phase shift π, introducing a relative sign change between the states of the A' and B' channels, i.e., at, $a_{B'}^\dagger \rightarrow -a_{B'}^\dagger$, and the product of output state on channels A" and B" is of the form given in Equation 7B. Accordingly, gate 210 performs the required controlled swap when input states |A> and |B> are qubit states as indicated in Equation 6.

$$(A_0 + A_1 a_A^\dagger)(B_0 + B_1 a_B^\dagger)|0\rangle \xrightarrow{|0\rangle_{C'}}$$ Equation 7A $$(A_0 + A_1 a_{A''}^\dagger)(B_0 + B_1 a_{B''}^\dagger)|0\rangle$$

$$(A_0 + A_1 a_A^\dagger)(B_0 + B_1 a_B^\dagger)|0\rangle \xrightarrow{|1\rangle_{C'}}$$ Equation 7B $$(A_0 + A_1 a_{B''}^\dagger)(B_0 + B_1 a_{A''}^\dagger)|0\rangle$$

A number of implementations suitable for controlled phase gate 214 are known for operations on photonic states. For example, controlled phase gate 214 can be implemented using linear optics. T. B. Pittman, B. C. Jacobs, and J. D. Franson, "Probabilistic quantum logic operations using polarizing beam splitters," Phys. Rev. A 64, 062311 (2001), for example, describes using linear optics and measurements in implementations of quantum gates that are probabilistic. These probabilistic quantum gates have inherent probabilities of detected failures to perform the desired operations and therefore may inefficiently use quantum resources. Alternatively, controlled phase gate 214 can be implemented using systems providing electromagnetically induced transparency (EIT) or a cross-Kerr non-linearity as described in R. G. Beausoleil, W. J. Munro, and T. P. Spiller, J. Mod. Opt. 51, 1559 (2004).

Hadamard gates 120 and 130 and detector 140 in QSC system 200 can be implemented using optical elements that are selected according to the representation used for the control qubit in channel C. In particular, Hadamard gates can be implemented using beam splitters for path-encoded photonic qubits or waveplates for polarization-encoded photonic qubits. For a qubit represented using single photon states, detector 140 can be implemented with a photon detector and a filter that passes only photons corresponding to state |0> (or alternatively state |1>). Detection of a photon then projects the state of the control qubit channel C" onto state |0> or |1>. Efficient single photon detectors suitable for this use are described by W. J. Munro, Kae Nemoto, R. G. Beausoleil and T. P. Spiller, "A High-Efficiency Quantum Non-Demolition Single Photon Number Resolving Detector," (arXiv:quant-ph/0310066).

Repeated measurement of channel C" in QSC system 200 by detector 140 can probabilistically determine whether input states |A> and |B> are equal or not equal in the same manner as described above in regard to Equation 4. Additionally, photons output on channels A" and B" of controlled swap gate 210 can be used elsewhere in a quantum information processing system (not shown). However, the full swap function of gate 210 is not required for determination of whether states |A> and |B> are equal. In particular, beam splitter 216, which completes the swap operation, can be omitted without affecting the comparison of state |A> and |B>.

QSC system 200 including gate 210 of FIG. 2A is also operational for comparisons of other types of states including coherent states, squeezed states, and superpositions of coherent states provided that beam splitters 212 and 216 implement the required transform or interference of the states. For example, if states |A> and |B> are respective coherent states $|\alpha>_A$ and $|\beta>_B$, Equation 8A indicates the desired operation of Hadamard gate 120 and beam splitter 212 on the input product state |A>|B>|C>. Controlled phase gate 214 transforms the state of the system 200 as shown in Equation 8B, before Hadamard gate 130 and beam splitter 216 provides the final output state given in Equation 8C. Equation 8C clearly shows that if parameters $\alpha$ and $\beta$ are equal, the probability of the control channel C" being in state $|1>_{C''}$ is zero. As a result, a measurement X identifying state $|1>_{C''}$ indicates that parameters $\alpha$ and $\beta$ are not equal.

$$|A\rangle|B\rangle|C\rangle = \qquad \text{Equation 8A}$$

$$|\alpha\rangle_A |\beta\rangle_B |0\rangle_C \to \left|\frac{\alpha+\beta}{\sqrt{2}}\right\rangle_{A'} \left|\frac{\alpha-\beta}{\sqrt{2}}\right\rangle_{B'} (|0\rangle_{C'} + |1\rangle_{C'}) 2^{-\frac{1}{2}}$$

$$\xrightarrow{C\text{-}Phase} \qquad \text{Equation 8B}$$

$$2^{-\frac{1}{2}}\left(\left|\frac{\alpha+\beta}{\sqrt{2}}\right\rangle_{A'}\left|\frac{\alpha-\beta}{\sqrt{2}}\right\rangle_{B'}|0\rangle_{C'} + \left|\frac{\alpha+\beta}{\sqrt{2}}\right\rangle_{A'}\left|\frac{\beta-\alpha}{\sqrt{2}}\right\rangle_{B'}|1\rangle_{C'}\right)$$

$$\to \frac{1}{2}((|\alpha\rangle_{A''}|\beta\rangle_{B''} + |\beta\rangle_{A''}|\alpha\rangle_{B''})|0\rangle_{C''} + \qquad \text{Equation 8C}$$

$$(|\alpha\rangle_{A''}|\beta\rangle_{B''} - |\beta\rangle_{A''}|\alpha\rangle_{B''})|1\rangle_{C''})$$

Figure 2B:
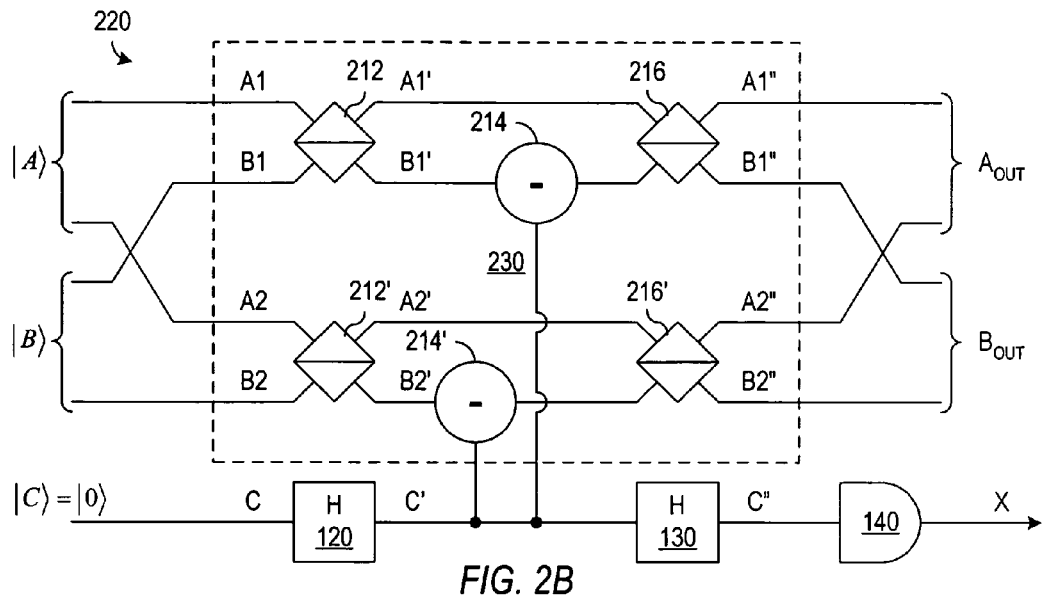

Principles of the swap gate implementation of FIG. 2A can be extended for use with quantum states |A> and |B> of multiple photonic channels. FIG. 2B, for example, illustrates a QSC system 220 in which state |A> is the input state of two photonic channels A1 and A2, and state |B> is the input state of two other photonic channels B1 and B2. In a manner similar to that described in regard to FIG. 2A, controlled phase gate 214 and beam splitters 212 and 216 operate on the states of channels A1 and B1, and controlled phase gate 214' and beam splitters 212' and 216' operate on the states of channels A2 and B2. The same state of channel C controls both controlled phase gates 214 and 214'. Accordingly, in an embodiment of the invention where each channel A1, B1, A2, or B2 corresponds to a qubit, a gate 250 performs the desired controlled swap of multi-channel states |A> and |B>. The architecture of FIG. 2B can be extended in a straight forward manner to a QSC system using n photon channels per compared state, which is useful for comparisons of $2^n$-dimensional quantum states |A> and |B>. The architecture of QSC system 220 when applied to two or n channels per quantum state |A> or |B> performs a serial test of the corresponding channels of states |A> and |B>.

Figure 2C:
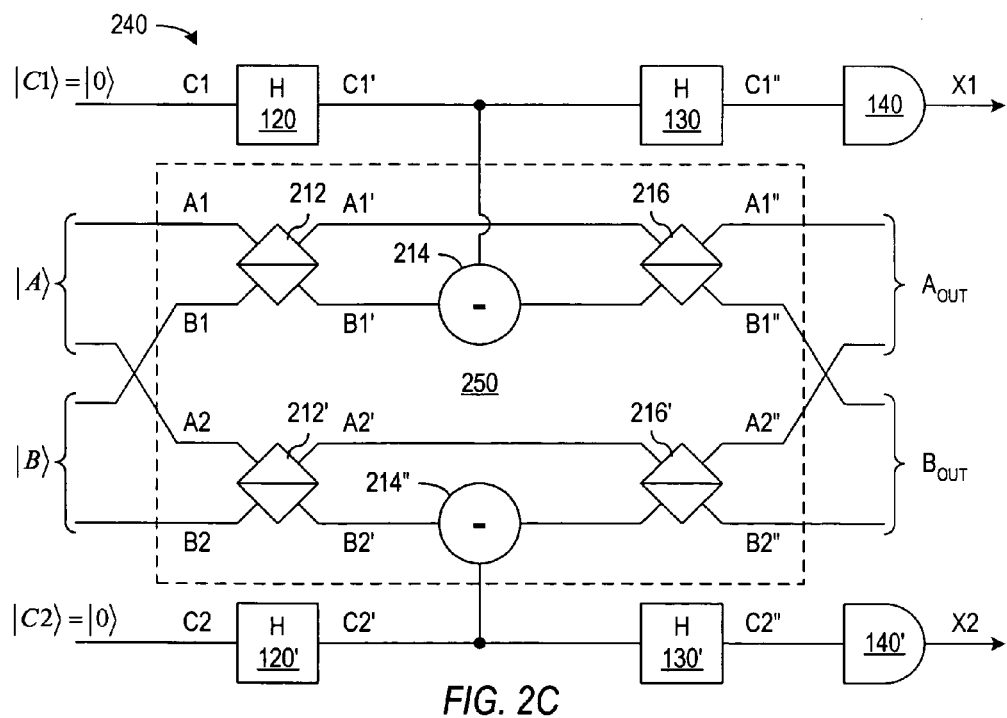

An alternative architecture for a multi-channel QSC system can test pairs of channels in parallel. FIG. 2C shows QSC system 240 in accordance with an embodiment of the invention that uses multiple parallel control channels C1 and C2 to test or compare multi-channel states |A> and |B>. In QSC system 240, controlled phase gate 214 and beam splitters 212 and 216 operate on the states of channels A1 and B1, and controlled phase gate 214' and beam splitters 212' and 216' operate on the states of channels A2 and B2. However, the states |C1> and |C2> of control channels C1 and C2 respectively control controlled phase gates 214 and 214', and separate detectors 140 and 140' provide measurements X1 and X2 of output control channels C1" and C2".

Analysis of QSC system 220 of FIGS. 2B shows that QSC system 220 can compare multi-qubit states |A> and |B> and detect differences between states |A> and |B> even when the qubits in state |A> (or |B>) are entangled. However, QSC system 240 of FIG. 2C is only effective at detecting a difference between or equality of states |A> and |B> if states |A> and |B> are product states of qubits, i.e., are unentangled states. However, examination of the operation of QSC system 240 of FIG. 2C on states |A> and |B> having a general form as indicated in Equation 9A shows that QSC system 240 can be used to detect entanglement. In Equation 9A, the vacuum state on which creation operators $a_{A1}^\dagger$, $a_{A2}^\dagger$, $a_{B1}^\dagger$, and $a_{B2}^\dagger$ for respective channels A1, A2, B1, and B2 operate is omitted to simplify the expression. Each value i, j, r, and s is limited to the range {0, 1} in the summation, is a power for a creation operator $a_{A1}^\dagger$, $a_{A2}^\dagger$, $a_{B1}^\dagger$, or $a_{B2}^\dagger$, and is an index for a complex parameters $A_{ij}$ or $B_{rs}$. Parameters $A_{ij}$ are the coefficients of state |A> in terms of the four basis states $\{|ij>_{A1,A2}\}$, and parameters $B_{rs}$ are the coefficients of state |B> in terms of the four basis states $\{|rs>_{B1,B2}\}$.

$$|A\rangle|B\rangle = \sum_{i,j,r,s=0}^{1} A_{ij}B_{rs} a_{A1}^{\dagger i} a_{A2}^{\dagger j} a_{B1}^{\dagger r} a_{B2}^{\dagger s} \qquad \text{Equation 9A}$$

Starting with states |A> and |B> of Equation 9A, the operation of Hadamard gates 120 and 120' transforms the state of the system as indicated in Equation 9B. Operation of controlled swap 250 then further transforms the state of the system to the form of Equation 9C, where exchanges among dummy indices i, j, r, and s are used to simplify the expression. Equation 9D indicates the output state $|\psi_{out}>$ after operation of Hadamard gates 130 and 130'. If states |A> and |B> are the same, parameters $A_{ij}$ or $B_{ij}$ are equal for all i and j, and terms in Equation 9D associated with states |01> and |10> of channels C1" and C2" vanish identically. Accordingly, and output state $|\psi_{out}>$ simplifies to the form of Equation 9E if states |A> and |B> are the same.

$$|A\rangle|B\rangle|0\rangle_{C1}|0\rangle_{C2} \xrightarrow{H} \sum_{i,j,r,s=0}^{1} A_{ij}B_{rs} a_{A1}^{\dagger i} a_{A2}^{\dagger j} a_{B1}^{\dagger r} a_{B2}^{\dagger s} \frac{1}{2}(|00\rangle + \qquad \text{Equation 9B}$$

$$|01\rangle + |10\rangle + |11\rangle)$$

$$\frac{1}{2}\sum_{i,j,r,s=0}^{1} A_{ij}B_{rs}(a_{A1''}^{\dagger i} a_{A2''}^{\dagger j} a_{B1''}^{\dagger r} a_{B2''}^{\dagger s}|00\rangle + \qquad \text{Equation 9C}$$

$$a_{A1''}^{\dagger i} a_{A2''}^{\dagger s} a_{B1''}^{\dagger r} a_{B2''}^{\dagger j}|01\rangle + a_{A1''}^{\dagger r} a_{A2''}^{\dagger j} a_{B1''}^{\dagger i} a_{B2''}^{\dagger s}|10\rangle +$$

$$a_{A1''}^{\dagger r} a_{A2''}^{\dagger s} a_{B1''}^{\dagger i} a_{B2''}^{\dagger j}|11\rangle) =$$

$$\frac{1}{2}\sum_{i,j,r,s=0}^{1} a_{A1''}^{\dagger i} a_{A2''}^{\dagger j} a_{B1''}^{\dagger r} a_{B2''}^{\dagger s}(A_{ij}B_{rs}|00\rangle +$$

$$A_{is}B_{rj}|01\rangle + A_{rj}B_{is}|10\rangle + A_{rs}B_{ij}|11\rangle)$$

-continued $$|\psi_{out}\rangle = \frac{1}{4} \sum_{i,j,r,s=0}^{1} a_{A1''}^{\dagger i} a_{A2''}^{\dagger j} a_{B1''}^{\dagger r} a_{B2''}^{\dagger s} [(A_{ij}B_{rs} +$$

Equation 9D $$A_{is}B_{rj} + A_{rj}B_{is} + A_{rs}B_{ij})|00\rangle +$$
$$(A_{ij}B_{rs} - A_{is}B_{rj} + A_{rj}B_{is} - A_{rs}B_{ij})|01\rangle +$$
$$(A_{ij}B_{rs} + A_{is}B_{rj} - A_{rj}B_{is} - A_{rs}B_{ij})|10\rangle +$$
$$(A_{ij}B_{rs} - A_{is}B_{rj} - A_{rj}B_{is} + A_{rs}B_{ij})|11\rangle]$$

$$|\psi_{out}\rangle = \frac{1}{2} \sum_{i,j,r,s=0}^{1} a_{A1''}^{\dagger i} a_{A2''}^{\dagger j} a_{B1''}^{\dagger r} a_{B2''}^{\dagger s} [(A_{ij}A_{rs} + A_{is}A_{rj})|00\rangle +$$

Equation 9E $$(A_{ij}A_{rs} - A_{is}A_{rj})|11\rangle]$$

The second term in Equation 9E is zero for all i, j, r, and s if state |A> is an unentangled state, i.e., is a product state, but the second term has a non-zero value if state |A> is an entangled state. Accordingly, if states |A> and |B> are both unentangled states, all measurements X1 and X2 of the control channels will indicate the control channels C1" and C2" are in state |00> if states |A> and |B> are equal, and measurements X1 and X2 indicating control channels C1" or C2" are in state |01>, |10>, or |11> indicate that the unentangled states |A> and |B> are not equal.

If states |A> and |B> are entangled states, there is a non-zero probability that measurements X1 and X2 will indicate the corresponding control channels C1" and C2" are in state |11> even when states |A> and |B> are equal. QSC system 240 can thus be used as an entanglement detector. In particular, if QSC system 240 tests two copies of a state |A>, measurements X1 and X2 will always indicate that the respective control channels C1" and C2" are in state |00> if state |A> is an unentangled state. However, if state |A> is an entangled state, Equation 9E indicates there is a non-zero probability that measurements X1 and X2 will indicate that the control channels C1" and C2" is in state |11>. As a result, repeated testing of copies of a state |A> using QSC system 240 can distinguish to a high likelihood whether or not the state |A> is entangled. (An absence of any measurements X1 and X2 indicating control channels C1" or C2" are in state |01> or |10> provides confirmation that the input states are in fact equal.)

QSC system 240 operating as an entanglement detector as described above can detect entanglement of a pair of qubits. The architecture of QSC system 240 can be extended to test entanglements of three or more qubits using three or more measurements control channels.

Figure 3A:
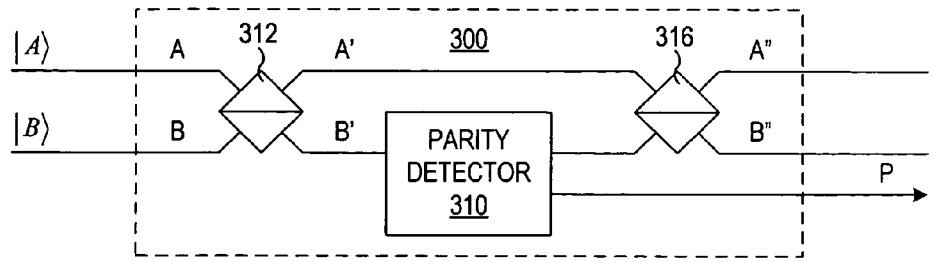
FIGS. 3A, 3B, and 3C show quantum state comparison systems in accordance with embodiments of the invention that use parity detection of selected photon channels.

In accordance with a further aspect of the invention, a QSC system can employ parity detection for comparisons of input states or entanglement detection. FIG. 3A shows a test system 300 including a pair of beam splitters 312 and 316 and a parity detector 310. Beam splitters 312 and 316 are set up to have the transformation properties given in Equations 5A and 5B, above. Accordingly, for input states |A> and |B> of the form given in Equation 6, the state of test system 300 is given in Equation 10. If states |A> and |B> are equal, the term in Equation 10 that is linear in the creation operator $a_{B'}^{\dagger}$, for channel B' is zero, and therefore the state of channel B' must contain an even number of photons.

$$|A\rangle|B\rangle = (A_0 + A_1 a_A^{\dagger})(B_0 + B_1 a_B^{\dagger})|0\rangle \rightarrow$$

Equation 10

-continued $$\frac{1}{2}(A_0 + A_1(a_{A'}^{\dagger} + a_{B'}^{\dagger}))(B_0 + B_1(a_{A'}^{\dagger} - a_{B'}^{\dagger}))|0\rangle =$$

$$\frac{1}{2}[A_0B_0 + (A_1B_0 + A_0B_1)a_{A'}^{\dagger} + (A_1B_0 - A_0B_1)a_{B'}^{\dagger} +$$

$$A_1B_1 a_{A'}^{\dagger 2} - A_1B_1 a_{B'}^{\dagger 2}]|0\rangle$$

Parity detector 310 determines whether the state of channel B' contains an even number or odd number of photons. A measurement from parity detector 310 indicating an odd number of photons in channel B' thus indicates that states |A> and |B> are not equal. A large number of repetitions of test of states |A> and |B> can thus determine to a high confidence level whether states |A> and |B> are equal. In an exemplary embodiment of the invention, parity detector 310 is a nonabsorbing, near-deterministic detector such as described in co-owned U.S. patent application Ser. No. 10/899,332, entitled "Nonlinear Electromagnetic Quantum Information Processing." An advantage of using a nonabsorbing or nondestructive parity detector 310 is the output of photons on channels A" and B", for possible use elsewhere in a quantum information processing system. Alternatively, parity detector 310 can be an absorptive photon number detector, that absorbs photons in channel B' and destroys the information in the input states, which may be desirable for security reasons.

Channels A' and B' after the measurement of channel B' in parity detector 310 are the input channels to beam splitter 316. If parity detector 310 is nonabsorbing, beam splitter 316 will provide output photon states on output channels A" and B", and the output photons will be in states |A> and |B> if states are equal |A> and |B>. However, beam splitter 316 is not required for comparison of states |A> and |B>. Accordingly, beam splitter 316 may be omitted in embodiments of the invention where output photons are not required, for example, in systems where parity detector 310 is an absorptive photon detector.

Figure 3B:
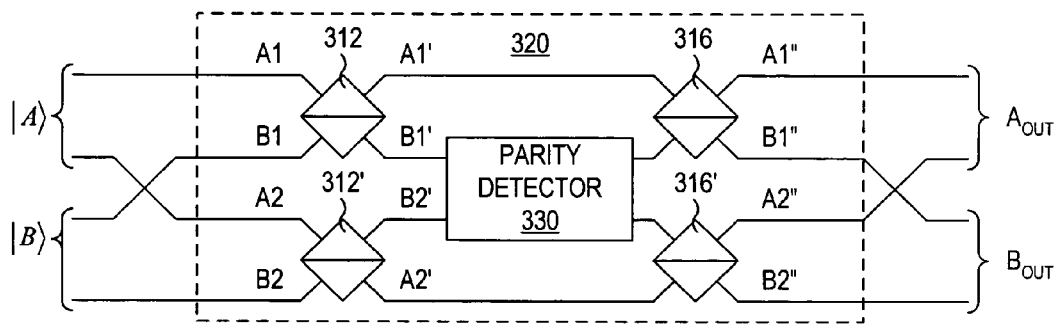

Test systems using parity detection can be extended to test multi-channel input states |A> and |B> in a manner similar to the extension of QSC systems using measurement of the control qubits for one or more controlled swap gate. FIG. 3B, for example, illustrates a test system 320 in which each input state |A> or |B> is a 2-qubit state. In test system 320, beam splitter 312 interferes photonic qubit on channel A1 of state |A> with a corresponding photonic qubit on channel B1 of state |B>, and beam splitter 312' interferes the qubit on channel A2 of state |A> with the photonic qubit on channel B2 of state |B>. A parity detector 330 detects whether the total number of photons on channels B1' and B2' is even or odd. A detection result P indicating an odd parity indicates that states |A> and |B> are not equal, and repeated detection results P indicating even parity indicate that states |A> and |B> are equal.

Figure 3C:
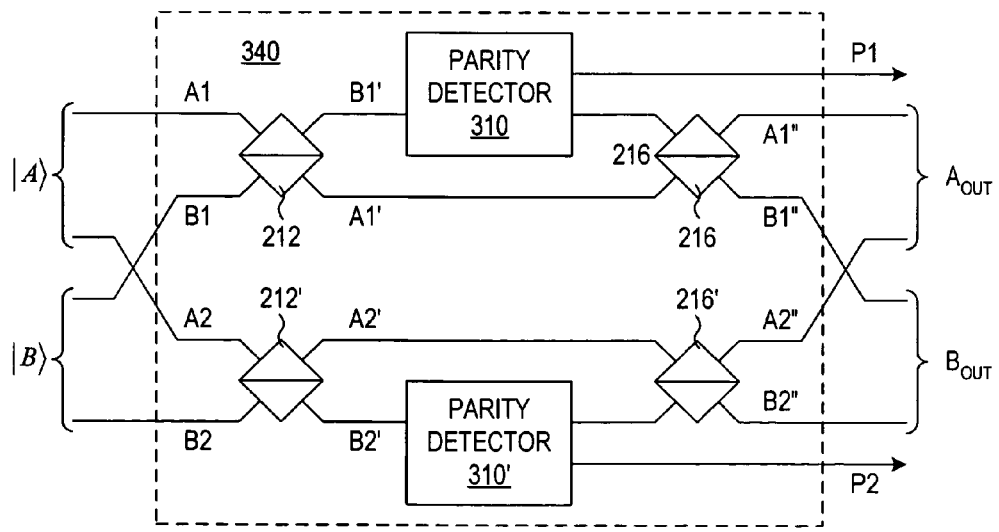

FIG. 3C shows another test system 340 using parity detection for testing of states |A> and |B>. Test system 340 differs from test system 320 in that parity detectors 310 and 310' separate detection results P1 and P2 indicating whether respective channels B1' and B2' contain even or odd number of photons. It can be shown that test system 340, like QSC system 240 of FIG. 2C, can detect whether states |A> and |B> differ if states |A> and |B> are unentangled states or alternatively can determine whether a state |A> is an entangled state or an unentangled state.

Figure 4A:
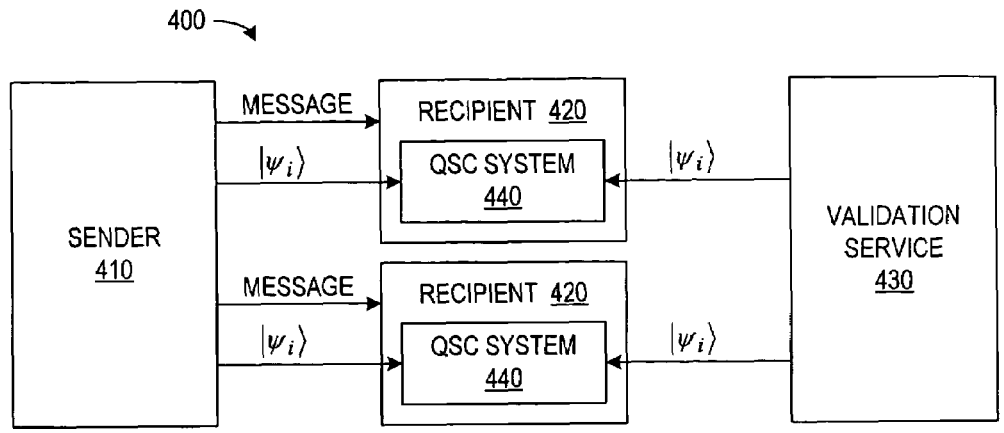
FIG. 4A illustrates transmission and authentication of information in an embodiment of the invention where multiple recipients receive a quantum signature.

The systems and processes for quantum state tests and comparisons described above are useful for the secure checking of quantum signatures. FIG. 4A illustrates a system 400 in which a sender 410 transmits a message with a quantum signature to multiple recipients 420 that desire to check or validate the origin of the message. In an exemplary embodiment, quantum signature is selected from a publicly known set S of D dimensional quantum states to, where the number N of states can be much larger than the dimension D of each state. (Typically, N is on the order of 2D.) The available quantum signatures to in set S are such that the inner product between two different signatures is small, i.e., for $1 \leq i \neq j \leq N$. Known hashing/error-correcting codes techniques can be used to provide a set S having the combination of a larger number N of states and small inner products. Gottesman and Chuang, "Quantum Digital Signatures" (arXiv:quant-ph/0105032) further describe processes for selection and use of quantum signatures.

The index i ($1 \leq \leq N$) for quantum signature $|\psi_i\rangle$ is private (e.g., known only by sender 410), but sender 410 publicly distributes copies of quantum signature $|\psi_i\rangle$ to recipients 420. Sender 410 in general can send to each recipient 420 multiple copies of quantum signature $|\psi_i\rangle$ some or all of which are transmitted in parallel or in series. An important property here is that k copies of the quantum state quantum signature $|\psi_i\rangle$ give no more than k×log(D) qubits of information about the private index i. Since the index contains log(N) or typically about D bits of information, distribution of k quantum copies of quantum signature $|\psi_i\rangle$ is safe as long as the number k of copies is less than about D/log(D).

Recipients 420, which collectively have several public copies of signature $|\psi_i\rangle$, request copies of the sender's signature from a validation service 430. Senders 420 then use QSC comparison systems 440 to verify that the quantum signatures associated with the message are the same as the signature from validation service 430.

Figure 4B:
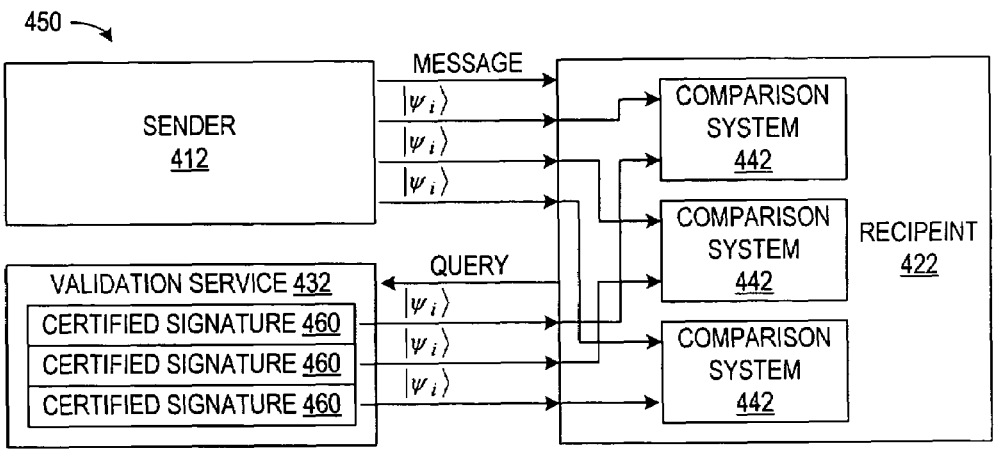
FIGS. 4B and 4C illustrates transmission and authentication of information in alternative embodiments of the invention using multiple certified copies of a quantum signature.

FIG. 4B illustrates a system 450 in accordance with another embodiment of the invention using QSC comparisons to validate a quantum signature. In system 450, a sender 412 sends a message to a recipient 422 that needs to verify the identity of sender 412. The message from sender 412 can be a classical digital message transmitted over a conventional network. Sender 412 further sends k copies of a quantum signature $|\psi_i\rangle$ to recipient 422 before, after, or with the message or in response to a query from recipient 422. Quantum signature $|\psi_i\rangle$ can be a quantum state of one or more photons transmitted to recipient 422 via an optical network, an optical fiber, or free space. Sender 412 can generally send the copies of quantum signature $|\psi_i\rangle$ one or more at a time to recipient 422.

To validate the quantum signature and/or the message, recipient 422 sends a query to a validation service 432 that has or can generate k copies of quantum signature $|\psi_i\rangle$. In one embodiment, the query includes information from the sender's message, so that validation service 432 can use private information of sender 412 and the content of the message to generate the correct quantum signature $|\psi_i\rangle$. Validation service 432 sends the k copies of quantum signature $|\psi_i\rangle$ to recipient 420. Recipient 422 can then use one or more comparison system 442 to perform k comparisons of the quantum signatures $|\psi_i\rangle$ from sender 412 to the quantum signatures $|\psi_i\rangle$ from validation service 432 and thus confirm to a high probability that the quantum signature $|\psi_i\rangle$ is valid. Recipient 422 can thus validate the identity of sender 412 and optionally confirm that the message was unaltered during transmission from sender 412. Additionally, the private information of sender 412 remains confidential to sender 412 and service 432 as long as public transmission of 2k copies of quantum signature $|\psi_i\rangle$ provides insufficient information for extraction of the private information.

Figure 4C:
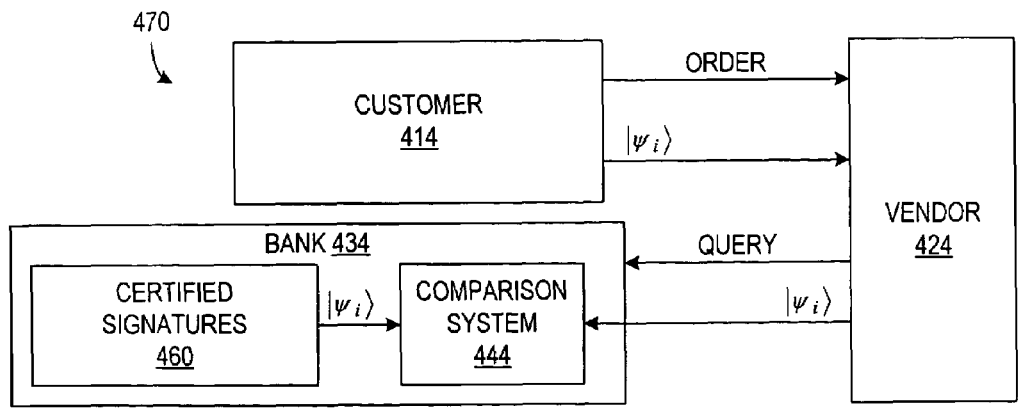

FIG. 4C shows an alternative configuration in which a customer 414 transmits an order to a vendor 424 with k copies of a quantum signature $|\psi_i\rangle$. Quantum signature $|\psi_i\rangle$ may in general depend on private information of customer 414 and the content of the order. To obtain payment for the order, vendor 424 sends a query to a bank 434 or other financial institution that is authorized to make payments on behalf of customer 412. Bank 434 has or can generate k certified copies 460 of quantum signature $|\psi_i\rangle$ and can use a QSC system 444 to compare the certified copies 460 to the k copies from sender 414 when determining whether to pay vendor 424. In FIG. 4C, vendor 424 relays the copies of quantum signature $|\psi_i\rangle$ from sender 414 to bank 434, but sender 414 could alternatively send quantum signatures $|\psi_i\rangle$ directly to bank 434 in response to a request from vendor 424.

In one variation of system 470, customer 414 gives certified copies 460 to bank 434 so that neither bank 434 nor vendor 424 has the private information of customer 414. Alternatively, both customer 414 and bank 434 have the same private information so that bank 434 can generate the k certified copies 460 based on the private information and on the order from vendor 424. Using QSC system 444 for quantum state comparison can then identify transactions that are invalid because customer 414 did not provide the quantum signature or because the order was altered after being placed by customer 414.

QSC comparisons can also be used for to provide data security in a system where the available dimension D of the quantum signature is small. For example, if each quantum signature is limited to being a qubit state, i.e., if dimension D of the quantum signature is two, four quantum signatures $|\psi_1\rangle$, $|\psi_2\rangle$, $|\psi_3\rangle$, and $|\psi_4\rangle$ are available having inner products $\langle\psi_i|\psi_j\rangle$ equal to ⅓ for i not equal to j. Qubit signatures $|\psi_1\rangle$, $|\psi_2\rangle$, $|\psi_3\rangle$, and $|\psi_4\rangle$ generally have coefficients corresponding to the vertices of a tetrahedron that is circumscribed by the unit sphere, while coefficients of a qubit generally correspond to a point on unit sphere.

Figure 5A:
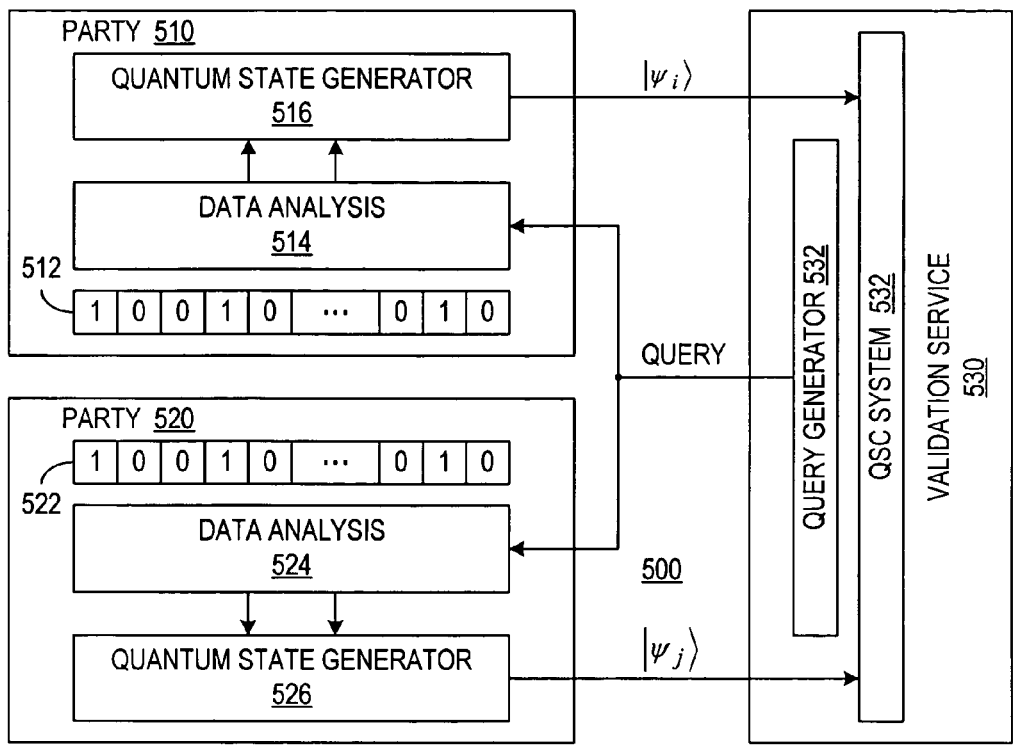
FIGS. 5A and 5B illustrate systems in accordance with embodiments of the invention using small dimension quantum states for secure validation of long data strings.

FIG. 5A illustrates system 500 that uses qubit states when validating that classical bit strings 512 and 522 in the respective possession of parties 510 and 520 are identical. Classical bit strings 512 and 522 can be of data strings of any length and in particular may correspond to a classical digital signature. A validation service 530 verifies the equality of strings 512 and 522 by repeatedly requesting quantum communications corresponding to any 2 bits of information derived from bit strings 512 and 522 and then comparing the returned quantum states $|\psi_i\rangle$ and $|\psi_j\rangle$.

In the illustrated embodiment of FIG. 5A, verification service 530 includes a query generator 532 that generates queries that can be transmitted classically to parties 510 and 520. Each query can request a quantum state $|\psi_1\rangle$, $|\psi_2\rangle$, $|\psi_3\rangle$, or $|\psi_4\rangle$ that encodes a 2-bit response to the query. For example, a verification service 530 can ask "what are bits 5 and 67 of your bit string 512 or 522?" or "what is the parity of the first 10 bits and the parity of the last 10 bits of your bit string 512 or 522?" Each party 510 or 520 has a classical data analysis system 514 or 524 that evaluates the query from service 530 and generates a classical 2-bit answer based on the content of bit string 512 or 522. Quantum state generators 516 and 526 of the respective parties 510 and 520 select the one of quantum states $|\psi_1\rangle$, $|\psi_2\rangle$, $|\psi_3\rangle$, and $|\psi_4\rangle$ having an index corresponding to the classical answer and transmit respective quantum states $|\psi_i\rangle$ and $|\psi_j\rangle$. In one embodiment, quantum states $|\psi_i\rangle$ and $|\psi_j\rangle$ are photonic states that can be transmitted to validation service 530 over appropriate channels.

Figure 5B:
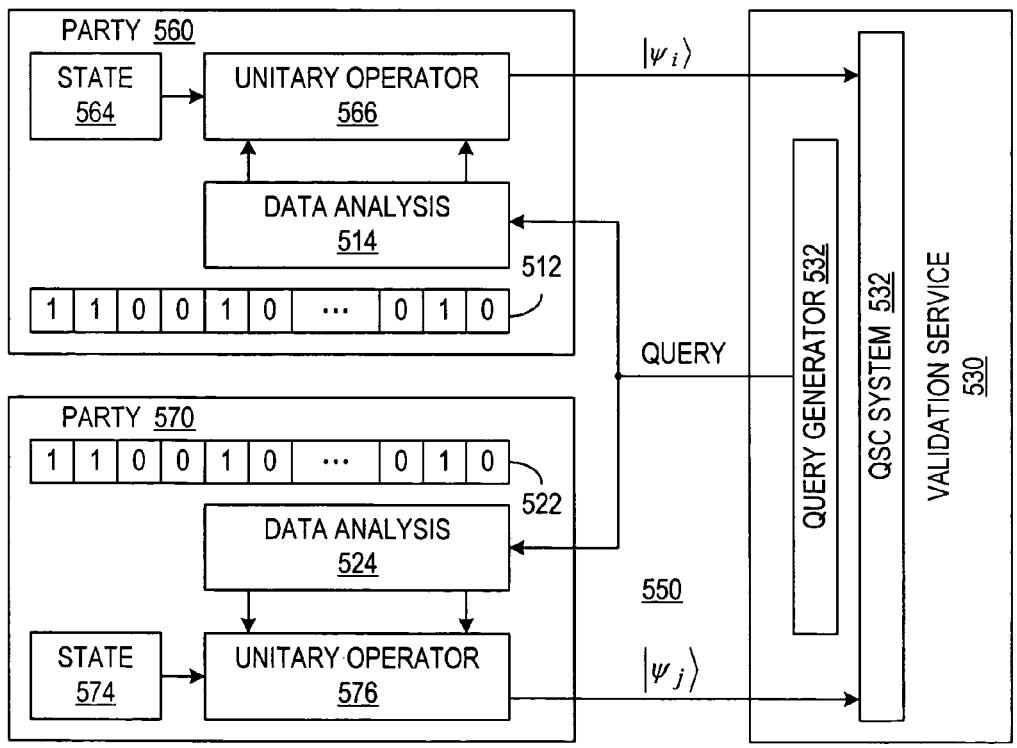

FIG. 5B shows an alternative embodiment of the invention in which parties 560 and 570 use a unitary quantum gate 566 or 576 to generates an output state $|\psi_i\rangle$ or $|\psi_j\rangle$. Each unitary quantum gate 566 or 576 has the classical input from a corresponding data analysis system 514 or 524 and a fixed quantum state 564 or 574 so that the output state $|\psi_i\rangle$ or $|\psi_j\rangle$ depends both on the classical information extracted from strings 512 and 522 and on quantum information in states 564 and 574. If states 564 and 574 are the same and unitary operators 566 and 576 are the same, parties 560 and 570 generate the same output state.

Validation service 530 performs a comparison of quantum states $|\psi_i\rangle$ and $|\psi_j\rangle$ to check (probabilistically) that both parties 510 and 520 provided the same reply. An advantage of this protocol is that neither party 510 nor 520 publicly reveals any 2-bit answer. (Parties 510 and 520 only send one qubit of information per query.) Hence, neither party 510 nor 520 can wiretap the quantum transmission from the other party 520 or 510 and quickly repeat the information to fool validation service 530. The classical strings 512 and 522 can be arbitrarily long, making the number of different queries from verification service 530 large enough that no query will be used twice.

Figure 6:
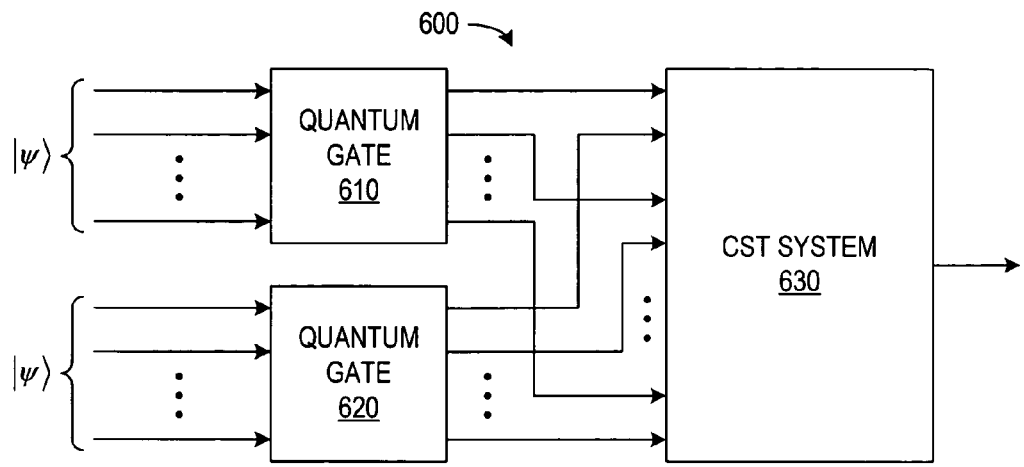
FIG. 6 shows a system in accordance with an embodiment of the invention using a controlled swap gate test to compare quantum gates.

Another application of the controlled-swap test is efficient comparison of two unitary gates. FIG. 6, for example, illustrates a system 600 using one or more QSC systems 630 for comparison of quantum gates 610 and 620. An input state for system 600 can generally be a product state of the form $|0, \psi, \psi\rangle$, where state $|0\rangle$ is directly input as the control qubit for QSC systems 630 and the same state $|\psi\rangle$ is input to both quantum gates 610 and 620. State $|\psi\rangle$ can be an arbitrary, pure D-dimensional quantum state. Identical states $|\psi\rangle$ may be generated, for example, by parametric down conversion of a D-dimensional photon state to a pair of entangled D-dimensional states. The first and second parts of the entangled photon state can then be applied to quantum gates 610 and 620, respectively.

Corresponding channels of the output states of quantum gates 610 and 620 are applied to respective test system(s) 630. Observation of the control bit (or bits) can then probabilistically detect differences in the output states. In particular, if quantum gates 610 and 620 are identical and the input states $|\psi\rangle$ are identical, the output states from quantum gates 610 and 620 are identical, which gives a 100% probability of the measurement outcome in test systems 630 corresponding to control state $|0\rangle$ or even parity. If the input states $|\psi\rangle$ are identical but quantum gates 610 and 620 are not identical, repeated measurements will eventually produce an outcome corresponding in the control qubit state $|1\rangle$ or odd parity.

Figure 7:
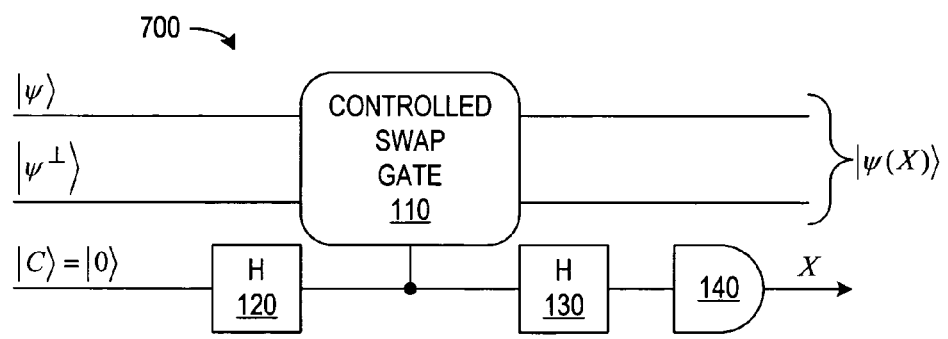
FIG. 7 illustrates an entanglement generator in accordance with an embodiment of the invention using a controlled swap gate and projective measurement.

The controlled-swap system described above can also be use as an entanglement generator. FIG. 7 illustrates an entanglement generator 700 in accordance with an embodiment of the invention. Entanglement generator 700 includes a controlled swap gate 110 and Hadamard gates 120 and 130, which can be structurally identical to corresponding components of any of the QSC systems described above.

An input state to entanglement generator 700 is a product of a control qubit state $|C\rangle=|0\rangle$, a D-dimensional state $|\psi\rangle$, and a D-dimensional state $|\psi^\perp\rangle$ that is orthogonal to state $|\psi\rangle$. As indicated by the left hand side of Equation 11, the output state of the coherent transformation (i.e., before detector 140 in entangler 700) is a maximally entangled state over the three parts (i.e., over the control channel and the two target channels). In each part, this entanglement occupies two dimensions, hence this state is equivalent (up to local transformations) to the GHZ state $(|0,0,0\rangle+|1,1,1\rangle)/\sqrt{2}$ if states $|\psi\rangle$ and $|\psi^\perp\rangle$ represent qubits. Note therefore that the amount of entanglement between the two D-dimensional systems equals the entanglement of a single entangled pair and not of a full D-dimensional entangled state.

$$\frac{1}{2}(|0, \psi, \psi^\perp\rangle + |1, \psi, \psi^\perp\rangle + \quad \text{Equation 11}$$
$$|0, \psi^\perp, \psi\rangle - |1, \psi^\perp, \psi\rangle) \xrightarrow{Measurement} |\psi(X)\rangle$$

The measurement as shown in Equation 11 projects the transformed state to a state $|\psi(X)\rangle$, which depends on the measurement result X as indicated in Equations 12. If the measurement has an outcome corresponding to control bit state $|0\rangle$, states $|\psi\rangle$ and $|\psi^\perp\rangle$ are entangled in a two party way in an even parity state. If the measurement has an outcome corresponding to control bit state $|1\rangle$, states $|\psi\rangle$ and $|\psi^\perp\rangle$ entangled in a two party way into an odd parity state. If input states $|\psi\rangle$ and $|\psi^\perp\rangle$ are not completely orthogonal, the output state will be less entangled, where the amount of entanglement equals the Von Neumann entropy of the mixed state $(|\psi\rangle\langle\psi|+|\psi^\perp\rangle\langle\psi^\perp|)$.

$$|\psi(0)\rangle = \frac{1}{\sqrt{2}}(|\psi, \psi^\perp\rangle + |\psi^\perp, \psi\rangle) \text{ and} \quad \text{Equations 12}$$
$$|\psi(1)\rangle = \frac{1}{\sqrt{2}}(|\psi, \psi^\perp\rangle - |\psi^\perp, \psi\rangle)$$

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system for manipulating quantum information, comprising:
 a first photonic channel for input of a first quantum state;
 a second photonic channel for input of a second quantum state;
 a first beam splitter positioned to interfere the first photonic channel and the second photonic channel; and
 a detector system positioned to interact with the second photonic channel, wherein a probability of a first measurement outcome from the detector system is 100% when the first quantum state and the second quantum state satisfy a first relation and is less than 100% when the first quantum state and the second quantum state satisfy a second relation.

2. The system of claim 1, wherein the detector system comprises:
 a third photonic channel;
 a controlled phase gate downstream of the first beam splitter and positioned to operate on the second photonic channel, wherein a state of the third photonic channel controls the controlled phase gate; and
 a detector that measures a state of the third photonic channel downstream of the controlled phase gate.

3. The system of claim 2, further comprising a Hadamard gate in the third photonic channel between the controlled phase gate and the detector.

4. The system of claim 3, wherein the detector performs a projective measurement that distinguishes a first state of the third channel that causes the controlled phase gate to shift a relative phase of the states of the first photonic channel and the second photonic channel and a second state of the third channel that prevents the controlled phase gate from changing the relative phase of the states of the first photonic channel and the second photonic channel.

5. The system of claim 1, wherein the detector system comprises a parity detector, wherein each of the first measurement outcome and the second measurement outcome corresponds to a different one of a measurement of an even number of photons in the second photonic channel and an odd number of photons in the second photonic channel.

6. The system of claim 1, wherein the first quantum state and the second quantum state satisfy the first relation by being equal and satisfy the second relation by being not equal.

7. The system of claim 1, wherein the first quantum state and the second quantum state satisfy the first relation by being the same unentangled state.

8. The system of claim 1, further comprising a second beam splitter positioned in the first photonic channel and the second photonic channel after measurement by the detector system.

9. The system of claim 8, wherein the detector system is nondestructive.

10. The system of claim 8, wherein the first quantum state is orthogonal to the second quantum state, and the second beam splitter generates an entangled state of a first output photonic channel and a second output photonic channel.

11. The system of claim 10, wherein output from the detector system identifies the entangled state.

12. The system of claim 1, further comprising:
a first network capable of transmission of classical data from a sender;
a second network capable of transmission of a quantum signature from the sender to the first photonic channel as the first quantum state; and
a validation service capable of providing a plurality of copies of the quantum signature to the second photonic channel as the second quantum state.

13. The system of claim 1, further comprising:
a payment services comprising the beam splitter and the detector system;
a first network capable of transmission of classical data from a customer to a vendor and from a vendor to a payment service; and
a second network capable of transmission of a quantum signature from the sender to the vendor and from the vendor to the first photonic channel as the first quantum state, wherein
the payment services uses output from the detector system when determining whether to pay the vendor.

14. The system of claim 1, further comprising:
a first quantum gate to be tested, wherein the first quantum gate is connected to provide one of the first quantum state and the second quantum state; and
a second quantum gate to provide the other of the first quantum state and the second quantum state, wherein output from the detector system indicates whether the first quantum gate passes a test.

15. The system of claim 1, further comprising:
a first plurality of photonic channels for input of the first quantum state, the first photonic channel being in the first plurality of photonic channels;
a second plurality of photonic channels for input of the second quantum state, the second photonic channel being in the second plurality of photonic channels;
a plurality of beam splitters, which includes the first beam splitter, each one the beam splitters being positioned to interfere a corresponding one of the photonic channels in the first plurality with a corresponding one of the photonic channels in the second plurality, wherein
the detector system interacts with the photonic channels in the second plurality of photonic channels.

16. The system of claim 15, wherein the detector system provides a single measurement outcome for all of the second plurality of photonic channels.

17. The system of claim 16, wherein the single measurement indicates a total number of photons in the second plurality of photonic channels.

18. The system of claim 1, wherein the detector system comprises:
a third photonic channel;
a plurality of controlled phase gate respectively downstream of the first beam splitters and positioned to operate on the respective photonic channels in the second plurality, wherein the third photonic channel controls the controlled phase gates; and
a detector that measures a state of the third photonic channel downstream of the controlled phase gates.

19. The system of claim 1, wherein the detector system comprises:
a third plurality of photonic channels;
a plurality of controlled phase gate respectively downstream of the first beam splitters and positioned to operate on the respective photonic channels in the second plurality, wherein states of the third photonic channels respectively control the controlled phase gates; and
a plurality of detectors that measure states of the third photonic channel downstream of the controlled phase gates.

20. The system of claim 1, wherein the detector system comprises a plurality of parity detectors respectively downstream of the first beam splitters and positioned to respectively operate on the photonic channels in the second plurality.

* * * * *